United States Patent
Pankanti et al.

(10) Patent No.: US 10,535,352 B2
(45) Date of Patent: Jan. 14, 2020

(54) AUTOMATED COGNITIVE RECORDING AND ORGANIZATION OF SPEECH AS STRUCTURED TEXT

(71) Applicant: INTERNATIONAL BUSINESS MACHINES CORPORATION, Armonk, NY (US)

(72) Inventors: Sharathchandra Pankanti, Fairfield County, CT (US); Stefan Ravizza, Wallisellen (CH); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

(21) Appl. No.: 15/814,677

(22) Filed: Nov. 16, 2017

(65) Prior Publication Data

US 2019/0147882 A1    May 16, 2019

(51) Int. Cl.
*G10L 15/18* (2013.01)
*G10L 15/26* (2006.01)
(Continued)

(52) U.S. Cl.
CPC ............ *G10L 15/265* (2013.01); *G10L 15/18* (2013.01); *G10L 15/22* (2013.01); *H04M 3/567* (2013.01); *H04M 3/568* (2013.01)

(58) Field of Classification Search
CPC ....... G10L 15/265; G10L 15/00; G10L 15/04; G10L 15/065; G10L 15/07; G10L 15/18;
(Continued)

(56) References Cited

U.S. PATENT DOCUMENTS 8,903,716 B2   12/2014   Chen et al.
8,914,452 B2   12/2014   Boston et al.
(Continued)

FOREIGN PATENT DOCUMENTS

EP    2317692 B1    5/2011

OTHER PUBLICATIONS

Alex Waibel, "Advances in Automatic Meeting Record Creation and Access", Proceedings of the International Conference on Acoustics, Speech, and Signal Processing, May 7-11, 2001, pp. 1-4.
(Continued)

*Primary Examiner* — Qi Han
(74) *Attorney, Agent, or Firm* — Cantor Colburn LLP; Anthony Curro

(57) ABSTRACT

A computer-implemented method includes associating, using a processor, one or more words in an electronic agenda template to at least one agenda item indicative of a point for discussion. The processor captures a real-time interaction comprising speech from one or more participants of a plurality of discussion participants into a digital representation. The processor isolates a portion of the real-time interaction from the digital representation. The portion is associated with a single speaker of the plurality of discussion participants. The processor makes at least one match between an isolated portion of the real-time interaction and the at least one agenda item. The processor determines an intent of the single speaker from the isolated portion and matching the determined intent of the single speaker to the at least one agenda item on the electronic agenda template, and generates discussion minutes output based on the matched intent and agenda item.

20 Claims, 8 Drawing Sheets

(51) Int. Cl.
*H04M 3/56* (2006.01)
*G10L 15/22* (2006.01)

(58) Field of Classification Search
CPC ............. G10L 15/1815; G10L 15/1822; G10L 15/183; G10L 15/20; G10L 15/22; G10L 15/26
USPC ....... 704/231, 235, 243, 246, 248, 250, 253, 704/257, 270, 270.1
See application file for complete search history.

(56) References Cited

U.S. PATENT DOCUMENTS

| | | |
|---|---|---|
| 9,117,447 B2 | 8/2015 | Gruber et al. |
| 9,165,289 B2 | 10/2015 | Motoyama |
| 9,269,073 B2 | 2/2016 | Sammon et al. |
| 2005/0131714 A1 | 6/2005 | Braunstein et al. |
| 2009/0271438 A1* | 10/2009 | Agapi ................... G06Q 10/109 |
| 2011/0112835 A1* | 5/2011 | Shinnishi ............. G06F 17/2755 704/235 |
| 2011/0137988 A1* | 6/2011 | Balogh .................... G10L 15/26 709/204 |
| 2016/0042192 A1 | 2/2016 | Motoyama |
| 2016/0154782 A1* | 6/2016 | Romano ............. H04M 3/5175 704/9 |
| 2016/0189713 A1 | 6/2016 | Liu |
| 2017/0263265 A1* | 9/2017 | Ashikawa ........... G06F 3/04817 |

OTHER PUBLICATIONS

Anonymous, "System for Individualistic Meeting Minutes Consolidation With Intelligent Categorization and Querying Mechanism", IP.com Electronic Publication Date: Apr. 22, 2014, pp. 1-4.

Clarence Ellis, et al., "Agent-Augmented Meetings", Agent Supported Cooperative Work, Springer US, 2003, pp. 27-52.

\* cited by examiner

AUTOMATED COGNITIVE RECORDING AND ORGANIZATION OF SPEECH AS STRUCTURED TEXT

BACKGROUND

The present invention relates generally to cognitive computing systems, and more specifically, to the automated cognitive recording and organization of speech as structured text using cognitive computing systems.

Programmed computers have been used to convert speech to readable text. In a known approach, the computer initially uses an analog-to-digital converter (ADC) to translate the vibrations caused by speech into digital data that the computer can understand. The computer divides the digital data into small segments (e.g., a few hundredths of a second), and then matches these segments to known phonemes in the appropriate language. In general, a phoneme is a representation of the sounds humans make and put together to form meaningful expressions. There are roughly 40 phonemes in the English language, while other languages have more or fewer phonemes. The computer then examines phonemes in the context of the other phonemes around them, generates a contextual phoneme plot, runs the plot through a complex statistical model, and compares the results to a large library of known words, phrases and sentences. The computer then determines what the speaker was likely saying and outputs the speech as readable text.

SUMMARY

Embodiments of the present invention are directed to a computer-implemented method for converting speech into structured text, the speech being generated by a plurality of sources. The computer-implemented method includes associating, using a processor, one or more words in an electronic agenda template to at least one agenda item indicative of a point for discussion. The processor captures a real-time interaction comprising speech from one or more participants of a plurality of discussion participants into a digital representation. The processor isolates a portion of the real-time interaction from the digital representation. The portion is associated with a single speaker of the plurality of discussion participants. The processor makes at least one match between an isolated portion of the real-time interaction and the at least one agenda item. The processor determines an intent of the single speaker from the isolated portion and matching the determined intent of the single speaker to the at least one agenda item on the electronic agenda template, and generates discussion minutes output based on the matched intent and agenda item.

A system and computer program product for performing the computer-implemented method for converting speech into structured text are also described are also describe.

DETAILED DESCRIPTION

Figure 1:
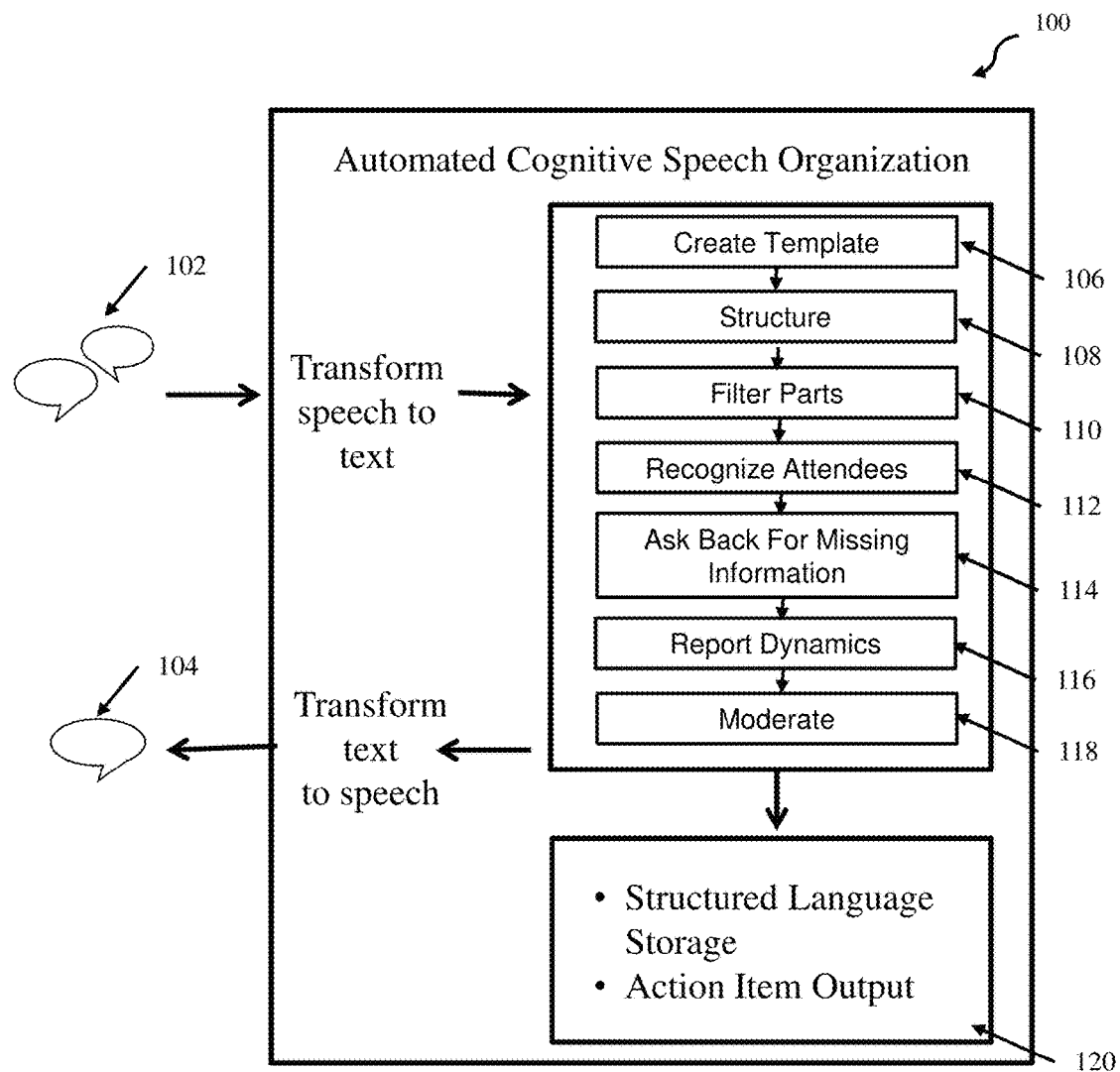
FIG. 1 depicts a flow diagram of a method for automated cognitive recording and organization of speech as structured text, according to embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies relevant to aspects of the present invention, distant speech recognition systems capture and recognize speech using microphones positioned at distances that may be up to several meters away from the speakers. Longer-distant speech recognition systems are free from constraints that tie the human speaker with the input device (e.g., microphone(s)) directly connected to or very close to the speaker. These systems provide robust distant microphone speech communication with cognitive computing technology that enables a host of powerful applications including human-robot communication, voice-controlled home automation systems, and speech monitoring and surveillance systems.

Unfortunately, the ease with which humans process distant speech presents technical challenges for cognitive computing systems designed to interface in a similar way. For example, problems of reverberation and additive background noise from living environments, business environments, and other scenarios must be overcome. Evaluations in this field have typically focused on reconstruction of separated signals, which is not the goal of speech recognition. Source separation and recognition, when treated as independent consecutive processing stages, have relied on relatively noise-free training data but experience difficulty in channel separation (and thus speaker identification and isolation in multi-speaker and noisy environments).

Accuracy of speech recognition may depend on various factors including error rates that increase as vocabulary size grows. Vocabulary is hard to recognize if it contains confusable words. For example, the 26 letters of the English alphabet can be difficult for cognitive computing systems to discriminate because they are confusable sounds, such as the E-set that includes B, C, D, E, G, P, T, V, Z.

Isolated, discontinuous speech not spoken in full sentences is also problematic. With isolated speech, single words are used, therefore it becomes easier for processing systems to recognize the speech. With discontinuous speech full sentences separated by silence are used, therefore it becomes easier to recognize the speech as well as with isolated speech. With continuous speech naturally spoken sentences are used, therefore it becomes harder to recognize the speech, different from both isolated and discontinuous speech.

Acoustical signals are structured into a hierarchy of units by cognitive processing systems. For example, phonemes, words, phrases, and sentences are various structures. Each level provides additional constraints. For example, known word pronunciations, or legal word sequences can compensate for errors or uncertainties at lower levels. By combining decisions probabilistically at all lower levels, and making more deterministic decisions only at the highest level, speech recognition by a machine is a process broken into several phases.

The recognition of sound patterns, as well as their classification into categories that represent human meaning are problematic for cognitive machines. Every acoustic signal can be broken in smaller more basic sub-signals. As the more complex sound signal is broken into the smaller sub-sounds, the processor creates different levels. At the top level complex sounds are processed, which are made of simpler sounds on a lower level. When the processing system breaks down the sound channel to lower levels, the system creates more basic sounds that are shorter and simpler than the original channel feed. At the lowest level, where the sounds are the most fundamental, a machine would check for simple and more probabilistic rules of what sound should represent. Once these sounds are put together into more complex sound on upper level, a new set of more deterministic rules should predict what new complex sound should represent.

The most upper level of a deterministic rule figures out the meaning of complex expressions. In the systems using neural network cognitive speech recognition, there are multiple steps of neural network approaches: First, the network digitizes the speech that to be recognized. For example, for telephone speech the sampling rate is 8000 samples per second. In another step, the system computes features of spectral-domain of the speech (with Fourier transform). For example, the neural processing system computes and processes the sound channel every 10 ms, with one 10 ms section called a frame.

Multi-step neural network approaches to speech recognition can be explained by further information. Sound is produced by reverberations of the ambient air or some other medium. Sound creates a wave which has 2 descriptions: amplitude (how strong is it), and frequency (how often it vibrates per second). The sound waves are digitized by the sampling processor. In some aspects, the system samples to approximate the wave strength at each time step of the sample. Collection of these numbers represent analog wave. Neural networks classify features into phonetic-based categories. Given basic sound blocks that a machine has digitized, one may include multiple numbers that describe a sound wave, and multiple sound waves describe words. Each frame has a unit block of sound, which the processor breaks into basic sound waves represented by numbers which, after a Fourier Transform, can be statistically evaluated by the processor associate a particular class of sounds to which it belongs.

Layers of nodes are identified by the processor that are indicative of a relative probability that the processor has determined what the original sound was meant to represent. The system searches to match the neural-network output scores for the best word, and determines the word that was most likely uttered based on probabilistic analysis.

Turning now to an overview of aspects of the invention, embodiments of the invention include a system for automated cognitive recording and organization of speech as structured text using a cognitive computing system as described above. The system interactively structures written text indicative of a verbal interaction (e.g., a meeting or group discussion). The system frees a human actor from writing the meeting minutes during a meeting, which can improve the productivity and social aspect of a group discussion. In one aspect the system structures meeting minutes automatically in real-time based on predefined templates using Natural Language Process (NLP) as input.

According to embodiments of the invention, a system configured to interactively gather information from various speakers, as communications among the speakers are in progress, according to a predefined electronic template using natural language. In other aspects of the invention, the system can be queried by one of the various speakers about details from a record of structured text using natural language speech input, and receive natural language speech output from the system responsive to the natural language question asked by the speaker. The system also mediates a speaker interaction in a way that promotes continuity of a group interaction with respect to the predefined electronic template.

Embodiments of the invention provide a system for cognitive recording and organization of spoken NLP input. FIG. 1 depicts a method 100 for cognitive recording and organization of spoken speech from a plurality of meeting participants during a meeting, according to embodiments of the invention. Aspects of the invention in FIG. 1 are explained in greater detail with respect to FIGS. 2-8.

Figure 8:
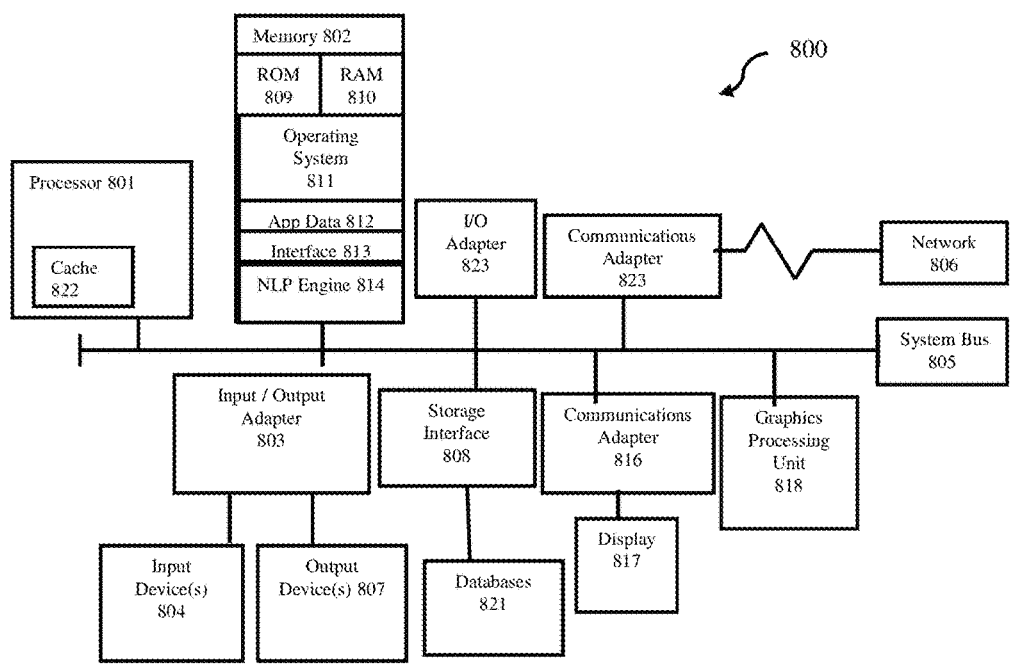
FIG. 8 depicts a block diagram of a computer system and environment, according to embodiments of the invention.

At block 106 of FIG. 1, the system (e.g., exemplary computing system 800, as shown in FIG. 8, operating as part of a cloud computing environment 600, FIG. 6) creates an input template such as, for example, an agenda, in an electronic form for associating free form text to agenda items. An input template includes, in natural language, topics for natural language discussion by human speakers in a group setting. For example, an input template may be an electronic list of natural language topics for discussion, which may be organized in a structure indicative of multiple related or unrelated subject matter. According to some embodiments, the processor receives the template in electronic form, parses the template using the processor, to extract one or more topics from each item in the template. An item may be, for example, a single agenda line or bullet point. Accordingly, the processor parses each line of the template, extracts a word or group of words indicative of a single idea or topic, and associates that topic to an electronic agenda structure saved to an operatively connected computer memory. The association includes a class for each parsed word or group of words, which is then associated by the processor to a plurality of interrelated statements as text. Those skilled in the art of cognitive speech processing systems appreciate that associating a statement as text based on a plurality of classes is routine and known.

At block 108, the system analyzes the agenda structure with NLP, and translates all discussions during the meeting from speech to text, so as to analyze the discussion using NLP. A discussion is received, by the processor, in an audio stream, and sampled to discrete words and phrases. The processor classifies each of the discrete words and phrases into a classification index. The classification index, in its entirety, can represent one or more ideas that would be discussed in a group setting. For example, the electronic structure created at step 106 now includes a plurality of linked words or phrases that are associated with a single cogent idea saved to memory.

At block 110, the system determines irrelevant parts of the discussion are filtered and interesting parts of the meeting are structured based on natural language classification and semantic trees. At block 112, the attendees are recognized by the system to uniquely identify each speaker (meeting participant). Accordingly, the cognitive computing system parses the audio channel to recognize individual speakers. Individual recognition of a speaker in a group of speakers can include identification of a time stamp associated with an audio portion, and identification of one or more phonemes unique to that speaker. The processor may identify a participant uniquely by identification of a mood (using vocal tones and associations between tonal transitions and recognized words), by emotions identified by the tonal transitions, semantic structure of phonemes identified by the processor, and statement classes. It is appreciated that those skilled in the art of speech recognition that participant/speaker recognition is accomplished in a variety of ways, using any of several known methods for unique identification.

At block 114, the system uses the initial electronic agenda of the meeting to associate the content of the meeting (which the system derives in real-time during the meeting) to the agenda points on the electronic agenda based on content of the discussion and the time in the meeting. Accordingly, the processor parses identified words and groups of words, matches the phonemes of each parsed word (portion of the sound channel signal) to a known word association in text form, and saves the identified association to a matrix in computer memory. The processor compares the matrix of distinct word structures to the agenda structure to determine whether there is information missing from the initial electronic agenda. Any identified information is saved to a missing information list in computer memory. Once the missing information from the electronic agenda is identified by the system, and the processor retrieves the missing information list from memory, translates any listed idea or word structure into NLP output indicative of a query to a human listener for that missing information, and outputs an auditory query output using a connected output device (e.g., a speaker). The processor outputs an NLP output asking the meeting participants for the missing information.

At block 120, the system creates one or more reports indicative of dynamics of the meeting (e.g., the meeting minutes), derives a list of one or more action items based on the dynamics, transforms the action item to speech, and outputs the NLP output as speech 104 for answering user (meeting participant) questions. Additionally, the system stores the meeting minutes, which are searchable for user queries as to prior meetings. The meeting minutes are stored to computer memory and indexed by class (task, summary, etc.), time stamps, speaker identifications, and statement relationship. For example, statement relationships may include one or more associations with an action item on the report, a unique speaker (human actor), a time of the spoken idea, and a participant agreement level that is indicative of an affirmative NLP response by the speaker to perform the task. The NLP response will include an association of the response (e.g., "yes, I can do that") with a class of item (class="task"), a time stamp (11:23 on Oct. 31, 2017) and an identified subject matter. At block 120 the system transmits the meeting minutes and to-dos (e.g., action items) via electronic and/or NLP output to any meeting participants associated with one or more of the action items.

The method 100 analyzes the meeting by means of passing control to one participant and a means for participant to direct the communication to the system, or the participants. The system uses participant communication 102 to create, follow up, or close an agenda item in a meeting. The participant communication 102 is captured from each participant into one or more digital representation presenting an interactive interface to the status of the representation to one or more participants that can correct the overall representation.

Figure 2:
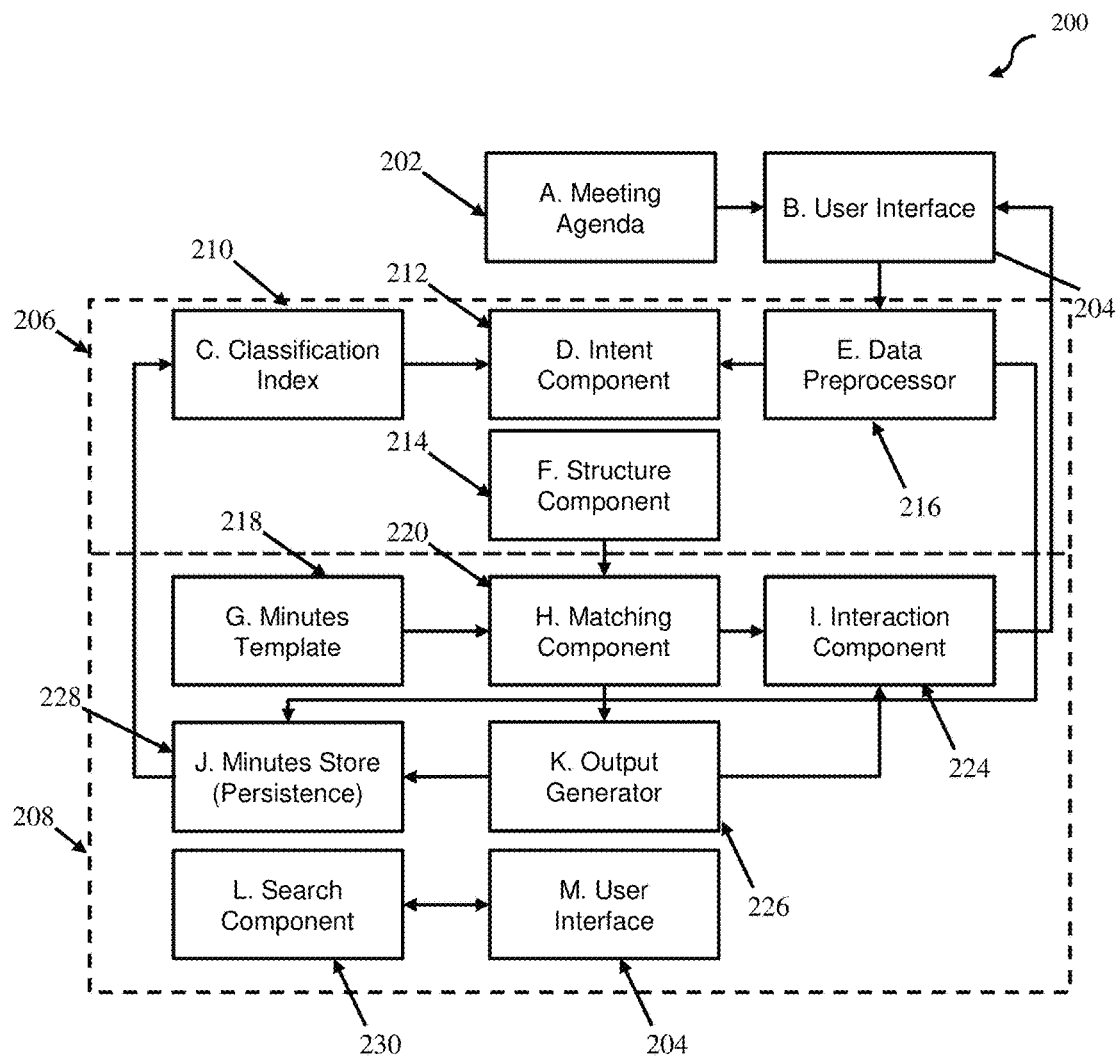
FIG. 2 depicts a system for performing the method of FIG. 1 according to embodiments of the invention.

FIG. 2 illustrates a component model of a system 200 for performing the method of FIG. 1. The system 200 includes a structuring element 206 and a consolidation element 208 that together facilitate and automatically generate meeting minutes in real-time. Real-time means, for the purpose of the present disclosure, events and/or processes occurring at the same time as the meeting, while the meeting is in progress.

As shown in FIG. 2, the structuring element includes a classification index 210, an intent component 212, a data preprocessor 216, and a structure component 214. The consolidation element 208 includes a minutes template 218, a matching component 220, an interaction component 224, a minutes storage component (persistence) 228, and an output generator 226. Additionally the component model includes a meeting agenda 202, user interface (UI) 204 and a search component 230.

The classification index 210 is used to classify statements recorded into categories such as, for example, «task», «summary», etc. The classification index 210 is trained through stored and approved minutes from prior meetings. The intent component 212 then uses the classification index 210 and the current and neighboring statements from the data preprocessor 216 and classifies them. The classification is made by the processor using known NLP classification techniques familiar to those skilled in the art.

The data preprocessor 216 uses the input received via audio or text input from the discussions during the meeting and transforms them into single statements, which may be classified and processed by the system and assigned to a speaker with voice recognition. The match between a particular voice signature (belonging to a meeting participant) and the classified single statements are saved to an operatively connected database. Unique voice signature The structure component 214 transforms the statement into a defined phrase according to the classification (e.g. shorten and structure into a distinct action item).

The minute template 218 in the consolidation element 208 represents a predefined template of how the resulting meeting minutes look from a structural point of view (Location/Attendees/Topics/Decisions/Action Items), and identifies which fields are mandatory. A mandatory component may be, for example, a time component, an action (task item, action item, etc.), a speaker identification, etc.

The matching component 220 then matches the classified statement, which the system derives from the classification index 210, to one of the agenda topics, or declines it in case the classified statement not relevant to the meeting. Accordingly, the matching component 220 causes the processor to parse the electronic stored agenda topics, identify a distinct topic from the stored agenda topics, and make a proposed association to a database of possible meanings. The processor uses probabilistic statistical methods known in the art to determine, with the greatest likelihood, whether a component identified as a distinct topic really is the meaning proposed as the matched meaning. When the likelihood exceeds a predetermined match threshold (e.g., 35% or more match probability), the matching component 220 registers the matched meaning as "present" in the electronic agenda, and verifies if other information identified in a predetermined "required information" database is missing from the electronic agenda.

Responsive to determining that there is information missing, the processor controls the interaction component 224 to ask for (query) missing information. An example of missing information may be a deadline for a task, a starting or stopping time, an address, etc. The processor outputs the query using the output device 807 (e.g., a speaker) to request input from a speaker. An example may be, "please tell us what day you will edit the group presentation." Accordingly, the speaker hears the system query for the missing information of time and/or day that a task will be performed.

The interaction component 224 then interacts with the meeting participants by displaying, in real-time, the updates to the meeting minutes. For example, in real time, an output device 807 may include a screen that outputs the query in written text form instead of or additional to the spoken output. Accordingly, the interaction component 224 asks for more needed information.

The Data persistency component 228 stores the meeting minutes and the voice stream input to enable recordings of the actual conversation as audio. Accordingly, the data persistency component 228 causes the processor to access memory registers identified as available, and stores the sampled audio stream in the registers.

The output generator 226 generates the meeting minutes and causes the interaction component 224 to interact with the meeting participants.

The search component 230 then enables the search with natural language on prior meeting minutes. Finally, the user interface 204, connected with the search component, is dedicated to administrative work, which accesses prior meeting minutes.

Figure 3:
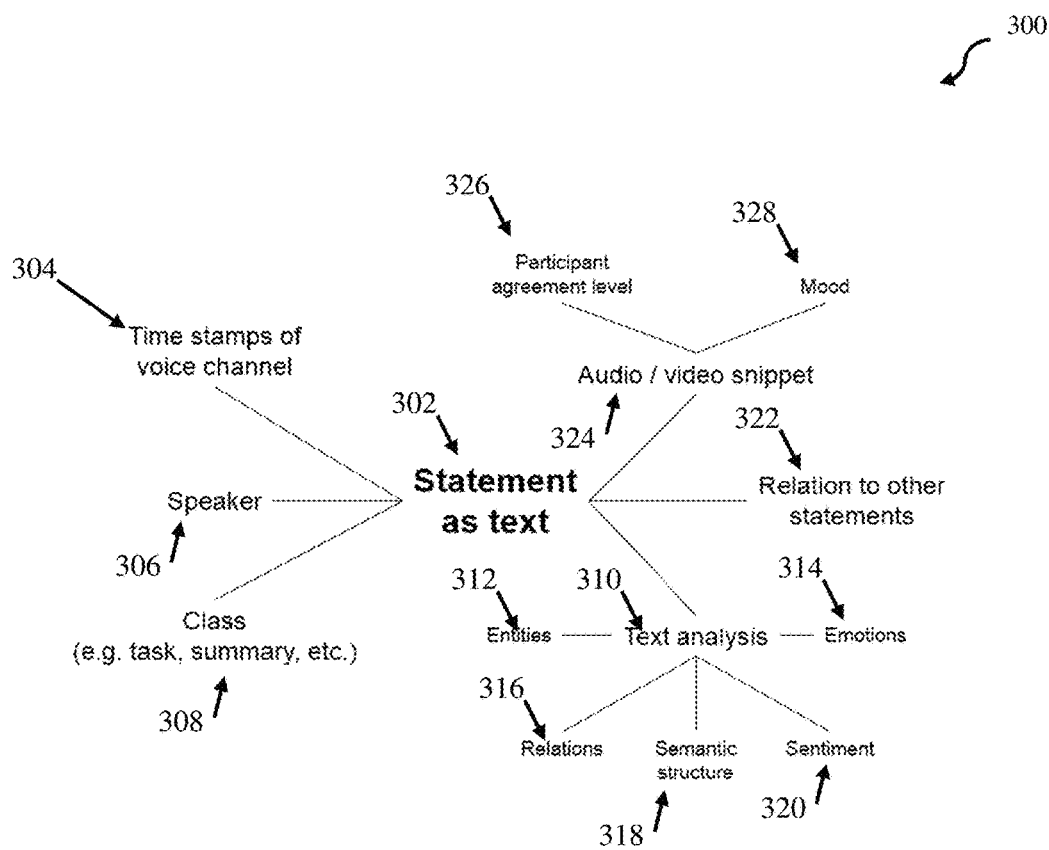
FIG. 3 depicts a data object model according to embodiments of the invention.

FIG. 3 illustrates data object model, representing generation of meeting participant statements into text by receiving multiple inputs. As shown in FIG. 3, statements as text can includes objects indicative of unique speakers 306, a time element 304 having a time stamp of a voice channel, and a class (classification) 308 that can include a task, summary, etc.

The statement as text 302 can also include audio or video snippets 324, which include the objects of participant agreement level 326 and a participant mood 328.

The relation to other statements object 322 identifies a connection between one statement and a second statement.

The text analysis object 310 can include one or more entities 312, and an associated emotions 314. The text analysis object 310 also includes a relations object 316, a semantic structure object 318, and a sentiment object 320.

Figure 4:
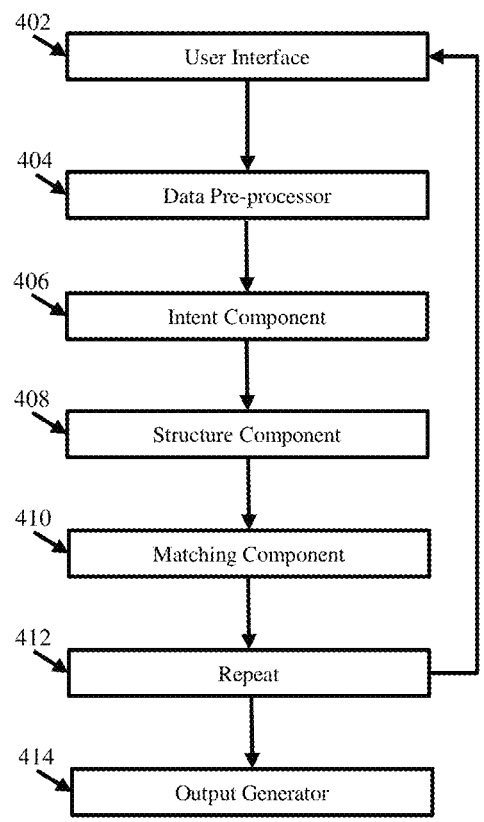
FIG. 4 depicts a data object flow diagram according to embodiments of the invention.

FIG. 4 illustrates an exemplary a flow diagram of an exemplary scenario of data object flow in the component model, according to an embodiment. As shown in block 402, the user interface receives input as a voice channel snippet. One example of a voice channel snippet may be the natural language spoken audio feed of "Peter has to finish the slide deck."

At block 404, the data preprocessor component receives the statement as text "Peter has to finish the slide deck" and determines an identity of the meeting participant speaking, e.g., speaker=Nicole, provides a time stamp component of the voice channel (e.g., 1:10 until 1:13), and provides a relationship to one or more other statements. For example, a relationship may be a pointer from one statement before and afterwards.

At block 406, the intent component includes determining an association between a task classification and a task associated with the statement as text "Peter has to finish the slide deck." For example, the task is "finish the slide deck" and may be classified as an action item "perform step at a future date."

At block 408, the structure component extends the data object with 1) a text analysis of the relationship of the owner of the task "Peter", and the task "finish the slide deck." The processor also analyses the text for other entities associated with the input. For example, an entity "presentation" is related to the entity "slide deck" as a natural language association (they may be synonymous). The association is recorded by the processor 801 as data objects linked by pointers.

At block 410, the matching component extends the data object with textual analysis of the relationships between the entities "presentation", the task "finish the slide deck" and the speaker identification object "Peter" as assignee of the task. One component missing, however, is the time component "finish by _____." In one aspect, the processor 801 extends the data object relationships with the missing information by querying for the missing information, receiving an answer as input, analyzing the answer, and assigning the answer to the missing data slot "finish by Tuesday, March 16."

Accordingly, at block 412, the processor repeats the prior steps 402-410 to analyze, match, query, receive response, and determine whether information is missing, until no information is missing.

At block 414, the processor 801 outputs the generated task statement of the combined data objects. For example, the owner of the task is now defined as Peter, the task is defined as finish the slide deck, and the deadline is defined as by tomorrow, March 16.

Figure 5:
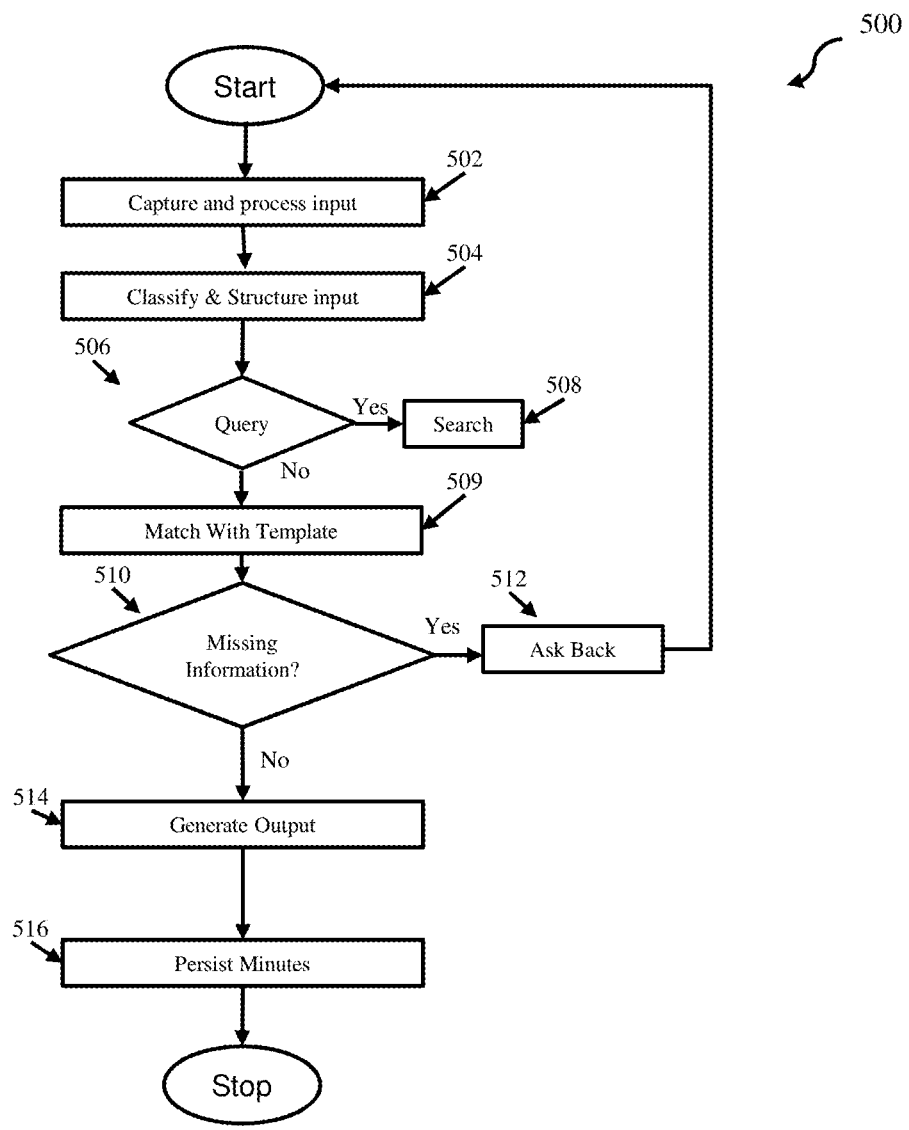
FIG. 5 depicts a method for automated cognitive recording and organization of speech as structured text according to embodiments of the invention.

FIG. 5 depicts a method for automated cognitive meeting minute management, according to an embodiment. As illustrated in FIG. 5, after an initial starting step, the processor (e.g., processor 801 as shown in FIG. 8, explained in greater detail hereafter), captures and processes audio & video data from the real-time meeting to extract statements as single text phrases and the owner of the phrase.

At block 506, the processor 801 classifies output from the capture and process input step 502, according to the classification index, and determines intent while taking multiple text phrases and their classifications from the past, and structures the intent according to the structure component 504.

At block 506, the processor 801 then performs interpretation of intent with follow up triggering a search (block 508) in case of user question (i.e., a query). At block 509, the processor 801 matches the intent with the predefined agenda.

At decision block 510, the processor 801 interprets the matching result with follow up triggering an ask back operation (block 512) responsive to determining that there is missing information.

At block 514, the processor 801 generates meeting minute entries, and at block 516 then stores the raw audio & video snippets inclusive timestamp and user recognition and stores the elaborated meeting minute entries to an operatively connected computer memory. At block 507, the processor 801 then performs a search in meeting minutes store for relevant information related to user question and at block 508, presents search results back to the user. In one aspect, the presentation may be in natural language. In another aspect, the presentation may be a text output. Finally, as shown in block 512, in case of missing information, the processor 801 asks back the meeting audience using natural language.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model

On-demand self-service: a cloud consumer can unilaterally provision computing capabilities, such as server time and network storage, as needed automatically without requiring human interaction with the service's provider.

Broad network access: capabilities are available over a network (e.g., network 806, as depicted in FIG. 8) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 806, as depicted in FIG. 8), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 806, as depicted in FIG. 8), servers, operating systems, or storage, but has control over the deployed applications and possibly application hosting environment configurations.

Infrastructure as a Service (IaaS): the capability provided to the consumer is to provision processing, storage, networks (e.g., network 806, as depicted in FIG. 8), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment.

DBaaS systems can include monitoring engines to track performance and usage, error monitoring, and data analysis engines.

Deployment Models

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 6:
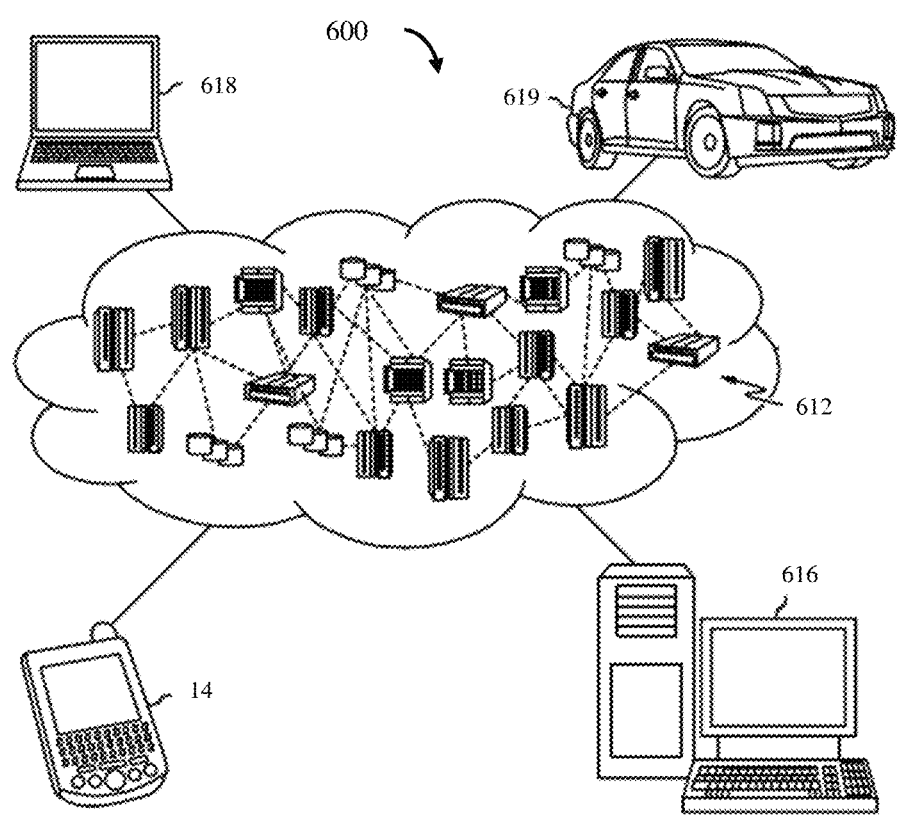
FIG. 6 depicts a cloud computing environment, according to embodiments of the invention.

Referring now to FIG. 6, a cloud computing environment 600 for use in practicing the teachings herein is depicted. As shown in FIG. 6, cloud computing environment 600 comprises one or more cloud computing nodes 612 with which local computing devices used by cloud consumers, such as, for example, a mobile device 614, a desktop computer 616, a laptop computer 618, and/or an automobile computer system 619 can communicate. Cloud computing nodes 612 can communicate with one another. They can be grouped (not shown) physically or virtually, in one or more networks 610, such as a Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 614-619 shown in FIG. 6 are intended to be illustrative only and that cloud computing nodes 612 and cloud computing environment 600 can communicate with any type of computerized device over any type of network and/or network addressable connection (e.g., using a web browser).

Figure 7:
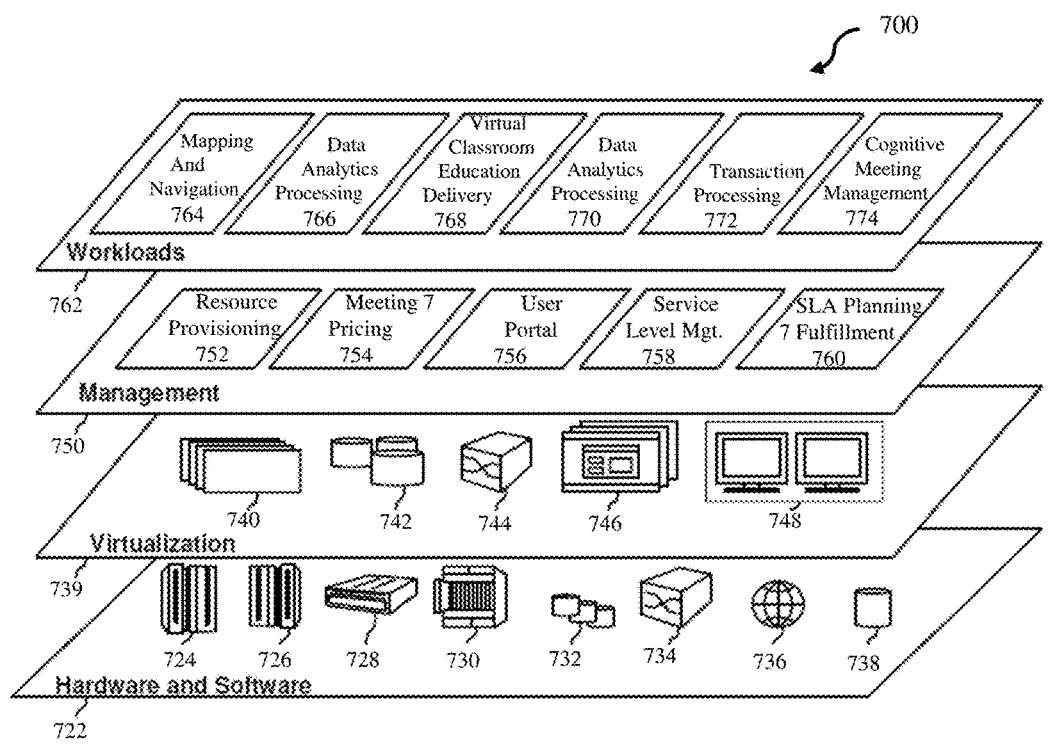
FIG. 7 depicts abstraction model layers, according to embodiments of the invention.

Referring now to FIG. 7, a set of functional abstraction layers 720 provided by cloud computing environment 710 (as depicted in FIG. 6) is shown. It should be appreciated that the components, layers, and functions of functional abstraction layers 720 depicted in FIG. 7 are illustrative only, and embodiments of the invention are not limited thereto. As depicted, the following layers and corresponding functions are provided:

A hardware and software layer 722 can include hardware and software components. Examples of hardware components can include, for example, mainframes 724, 7RISC (Reduced Instruction Set Computer) architecture based servers 726, servers 728, blade servers 730, storage devices 732, and networks and networking components 734. In some embodiments, software components include network application server software 736 and database software 738.

A virtualization layer 739 can provide an abstraction layer from which the following examples of virtual entities can be provided: virtual servers 740, virtual storage 742, virtual networks 744, which can include virtual private networks, virtual applications and operating systems 746, and virtual clients 748.

In one example, a management layer 750 can provide the functions described below. A resource provisioning module 752 can provide dynamic procurement of computing resources and other resources that can be utilized to perform tasks within the cloud computing environment. A metering and pricing resource 754 can provide cost tracking as resources are utilized within the cloud computing environment, and billing or invoicing for consumption of these resources. In one example, metering and pricing resources can include application software licenses. A user portal 756 can provide access to cloud computing environment 600 for consumers and system administrators (not shown). In some embodiments, user portal 756 can provide security and/or identity verification for cloud consumers (e.g., one or more consumers operating one or more of computing devices 614-619) and tasks, as well as protection for data and other resources. A service level management resource 758 can provide cloud computing resource allocation and management such that required service levels are met. A service level agreement (SLA) planning and fulfillment resource 760 can provide pre-arrangement for, and procurement of cloud computing resources for which a future requirement is anticipated in accordance with an SLA.

A workloads layer 762 can provide functionality for which the cloud computing environment can be utilized. For example, workloads layer 762 can include a mapping and navigation resource 764, a software development and lifecycle management resource 766, a virtual classroom education delivery resource 768, a data analytics processing resource 770, a transaction processing resource 772, and automated cognitive meeting minute management 774.

FIG. 8 illustrates a block diagram of an exemplary computing environment and computer system 800 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 800 therefore can embody a general-purpose computer. In another exemplary embodiment, the implementation can be part of a mobile device, such as, for example, a mobile phone, a personal data assistant (PDA), a tablet computer, etc.

As shown in FIG. 8, the computer 800 includes processor 801. Computer 800 also includes memory 802 communicatively coupled to processor 801, and one or more input/output adapters 803 that can be communicatively coupled via system bus 805. Memory 802 can be communicatively coupled to one or more internal or external memory devices via a storage interface 808. Communications adapter 816 can communicatively connect computer 800 to one or more networks 806. System bus 805 can communicatively connect one or more user interfaces via input/output (I/O) adapter 803. I/O adapter 803 can connect a plurality of input devices 804 to computer 800. Input devices can include, for example, a keyboard, a mouse, a microphone, a sensor, etc. System bus 805 can also communicatively connect one or more output devices 807 via I/O adapter 803. Output device 807 can include, for example, a display, a speaker, a touchscreen, etc.

Processor 801 is a hardware device for executing program instructions (aka software), stored in a computer-readable memory (e.g., memory 802). Processor 801 can be any custom made or commercially available processor, a central processing unit (CPU), a plurality of CPUs, an auxiliary processor among several other processors associated with the computer 800, a semiconductor based microprocessor (in the form of a microchip or chip set), or generally any device for executing instructions. Processor 801 can include a cache memory 822, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 822 can be organized as a hierarchy of more cache levels (L1, L2, etc.).

Processor 801 can be disposed in communication with one or more memory devices (e.g., RAM 809, ROM 810, one or more external databases 821, etc.) via a storage interface 808. Storage interface 808 can also connect to one or more memory devices including, without limitation, one or more databases 821, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 802 can include random access memory (RAM) 809 and read only memory (ROM) 810. RAM 809 can be any one or combination of volatile memory elements (e.g., DRAM, SRAM, SDRAM, etc.). ROM 810 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 802 can incorporate electronic, magnetic, optical, and/or other types of non-transitory computer-readable storage media. Memory 802 can also be a distributed architecture, where various components are situated remote from one another, but can be accessed by processor 801.

The instructions in memory 802 can include one or more separate programs, each of which can include an ordered listing of computer-executable instructions for implementing logical functions. In the example of FIG. 8, the instructions in memory 802 can include an operating system 811. Operating system 811 can control the execution of other computer programs and provides scheduling, input-output control, file and data management, memory management, and communication control and related services.

The program instructions stored in memory 802 can further include application data 812, and for a user interface 813.

Memory 802 can also include program instructions for a natural language processing (NLP_Engine 814, configured to perform one or more of the natural language processing steps described herein.

I/O adapter 803 can be, for example but not limited to, one or more buses or other wired or wireless connections. I/O adapter 803 can have additional elements (which are omitted for simplicity) such as controllers, microprocessors, buffers (caches), drivers, repeaters, and receivers, which can work in concert to enable communications. Further, I/O adapter 803 can facilitate address, control, and/or data connections to enable appropriate communications among the aforementioned components.

I/O adapter 803 can further include a display adapter coupled to one or more displays. I/O adapter 803 can be configured to operatively connect one or more input/output (I/O) devices 807 to computer 800. For example, I/O 803 can connect a keyboard and mouse, a touchscreen, a speaker, a haptic output device, or other output device. Output devices 807 can include but are not limited to a printer, a scanner, and/or the like. Other output devices can also be included, although not shown. Finally, the I/O devices connectable to I/O adapter 803 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 800 can include a mobile communications adapter 823. Mobile communications adapter 823 can include GPS, cellular, mobile, and/or other communications protocols for wireless communication.

In some embodiments, computer 800 can further include communications adapter 816 for coupling to a network 806.

Network 806 can be an IP-based network for communication between computer 800 and any external device. Network 806 transmits and receives data between computer 800 and devices and/or systems external to computer 800. In an exemplary embodiment, network 806 can be a managed IP network administered by a service provider. Network 806 can be a network internal to an aircraft, such as, for example, an avionics network, etc. Network 806 can be implemented in a wireless fashion, e.g., using wireless protocols and technologies, such as WiFi, WiMax, etc. Network 806 can also be a wired network, e.g., an Ethernet network, an ARINC 429 network, a controller area network (CAN), etc., having any wired connectivity including, e.g., an RS232 connection, R5422 connection, etc. Network 806 can also be a packet-switched network such as a local area network, wide area network, metropolitan area network, Internet network, or other similar type of network environment. The network 806 can be a fixed wireless network, a wireless local area network (LAN), a wireless wide area network (WAN) a personal area network (PAN), a virtual private network (VPN), intranet or other suitable network system.

Network 806 can operatively connect computer 800 to one or more devices including device 817, device 818, and device 820. Network 806 can also connect computer 800 to one or more servers such as, for example, server 819.

If computer 800 is a PC, workstation, laptop, tablet computer and/or the like, the instructions in the memory 802 can further include a basic input output system (BIOS) (omitted for simplicity). The BIOS is a set of routines that initialize and test hardware at startup, start operating system 811, and support the transfer of data among the operatively connected hardware devices. The BIOS is typically stored in ROM 810 so that the BIOS can be executed when computer 800 is activated. When computer 800 is in operation, processor 801 can be configured to execute instructions stored within the memory 802, to communicate data to and from the memory 802, and to generally control operations of the computer 800 pursuant to the instructions. The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for converting speech into structured text, the speech being generated by a plurality of sources, the computer-implemented method comprising:
   associating, using a processor, one or more words in an electronic agenda template to at least one agenda item indicative of a point for discussion;
   capturing, using the processor, a real-time interaction comprising speech from one or more participants of a plurality of discussion participants into a digital representation;
   isolating, using the processor, a portion of the real-time interaction from the digital representation, wherein the portion is associated with a single speaker of the plurality of discussion participants, and making at least one match between an isolated portion of the real-time interaction and the at least one agenda item;
   determining, using the processor, an intent of the single speaker from the isolated portion and matching the determined intent of the single speaker to the at least one agenda item on the electronic agenda template; and
   generating, using the processor, a discussion minutes output based on the matched intent and agenda item.

2. The computer-implemented method of claim 1, wherein determining the intent of the single speaker comprises, after capturing the real-time interaction:
   receiving, using the processor, a spoken communication indicative of an intent to start or stop speaking; and
   granting or terminating, using the processor, discussion control to the single speaker, wherein the discussion control allows or disallows the single speaker to speak during the real-time interaction.

3. The computer-implemented method of claim 1, wherein the structuring is based on a predefined template.

4. The computer-implemented method of claim 1, wherein the structuring receives Natural Language Processing (NLP) as input.

5. The computer-implemented method of claim 1, wherein generating the discussion minutes output comprises:
   determining, using the processor, whether there is missing information on the electronic agenda template;
   outputting, using the processor, a query for the missing information on the electronic agenda template to the plurality of speakers, in natural language, during the real-time interaction;
   receiving, using the processor, an input in natural language from one or more of the plurality of speakers, the input indicative of a response to the query;
   matching, using the processor, the input indicative of the response to the missing information;
   saving, to a computer memory, a digital representation of the input to the discussion minutes; and
   generating, using the processor, the discussion minutes output based on the electronic agenda template.

6. The computer-implemented method of claim 5, wherein the discussion minutes output is NLP output.

7. The computer-implemented method of claim 6, further comprising:
   receiving, using the processor, a NLP input to search the digital representation for an agenda item; and
   generating, using the processor, an NLP output indicative of the agenda item.

8. A system for converting speech into structured text, comprising:
   a processor configured to:
      associate one or more words in an electronic agenda template to at least one agenda item indicative of a point for discussion;
      capture a real-time interaction comprising speech from one or more participants of the plurality of discussion participants into a digital representation;
      isolate a portion of the real-time interaction from the digital representation, wherein the portion is associated with a single speaker of the plurality of discussion participants, and make at least one match between an isolated portion of the real-time interaction and the at least one agenda item;
      determine an intent of the single speaker from the isolated portion and matching the determined intent of the single speaker to the at least one agenda item on the electronic agenda template; and
      generate a discussion minutes output based on the matched intent and agenda item.

9. The system of claim 8, wherein determining the intent of the single speaker comprises, after capturing the real-time interaction:
   receiving, using the processor, a spoken communication indicative of an intent to start or stop speaking; and
   granting or terminating, using the processor, discussion control to the single speaker, wherein the discussion control allows or disallows the single speaker to speak during the real-time interaction.

10. The system of claim 8, wherein the structuring is based on a predefined template.

11. The system of claim 8, wherein the structuring receives Natural Language Processing (NLP) as input.

12. The system of claim 8, wherein generating the discussion minutes output comprises:
   determining, using the processor, whether there is missing information on the electronic agenda template;
   outputting, using the processor, a query for the missing information on the electronic agenda template to the plurality of speakers, in natural language, during the real-time interaction;
   receiving, using the processor, an input in natural language from one or more of the plurality of speakers, the input indicative of a response to the query;
   matching, using the processor, the input indicative of the response to the missing information;
   saving, to a computer memory, a digital representation of the input to the discussion minutes; and
   generating, using the processor, the discussion minutes output based on the electronic agenda template.

13. The system of claim 12, wherein the discussion minutes output is NLP output.

14. The system of claim 13, further comprising:
   receiving, using the processor, a NLP input to search the digital representation for an agenda item; and
   generating, using the processor, an NLP output indicative of the agenda item.

15. A computer program product for structuring and recording discussion minutes of a plurality of discussion participants during a discussion, the computer program product comprising a computer readable storage medium having program instructions embodied therewith, the program instructions executable by a processor to cause the processor to perform a method comprising:

associating, using a processor, one or more words in an electronic agenda template to at least one agenda item indicative of a point for discussion;

capturing, using the processor, a real-time interaction comprising speech from one or more participants of the plurality of discussion participants into a digital representation;

isolating, using the processor, a portion of the real-time interaction from the digital representation, wherein the portion is associated with a single speaker of the plurality of discussion participants, and making at least one match between an isolated portion of the real-time interaction and the at least one agenda item;

determining, using the processor, an intent of the single speaker from the isolated portion and matching the determined intent of the single speaker to the at least one agenda item on the electronic agenda template; and generating, using the processor, a discussion minutes output based on the matched intent and agenda item.

16. The computer program product of claim 15, wherein determining the intent of the single speaker comprises, after capturing the real-time interaction:

receiving, using the processor, a spoken communication indicative of an intent to start or stop speaking; and granting or terminating, using the processor, discussion control to the single speaker, wherein the discussion control allows or disallows the single speaker to speak during the real-time interaction.

17. The computer program product of claim 15, wherein the structuring is based on a predefined template.

18. The computer program product of claim 15, wherein the structuring receives Natural Language Processing (NLP) as input.

19. The computer program product of claim 15, wherein generating the discussion minutes output comprises:

determining, using the processor, whether there is missing information on the electronic agenda template;

outputting, using the processor, a query for the missing information on the electronic agenda template to the plurality of speakers, in natural language, during the real-time interaction;

receiving, using the processor, an input in natural language from one or more of the plurality of speakers, the input indicative of a response to the query;

matching, using the processor, the input indicative of the response to the missing information;

saving, to a computer memory, a digital representation of the input to the discussion minutes; and generating, using the processor, the discussion minutes output based on the electronic agenda template.

20. The computer program product of claim 19, wherein the discussion minutes output is NLP output.

* * * * *